UNITED STATES PATENT OFFICE.

NICHOLAS ALEXEIEVITCH BIBIKOV, OF NEW YORK, N. Y., ASSIGNOR OF ONE-FOURTH TO HENRY CONNETT, OF NEW YORK, N. Y.

COMPOUND FOR COATING IRON AND STEEL.

No. 801,842.　　　Specification of Letters Patent.　　　Patented Oct. 17, 1905.

Application filed June 7, 1904. Renewed March 17, 1905. Serial No. 250,606.

*To all whom it may concern:*

Be it known that I, NICHOLAS ALEXEIEVITCH BIBIKOV, a citizen of the United States, residing in the borough of Brooklyn, in the county of Kings, in the city and State of New York, have invented certain Improvements in Compounds for Coating Iron and Steel, of which the following is a specification.

This invention relates to compositions of matter of a paint-like character for coating metals to protect them against oxidation; and the object of the invention is to provide a composition which may be applied with a brush to the surfaces of iron or steel to render them rust-proof or protect them from oxidation.

It has been a common practice to coat the surfaces of structures made from iron and steel with paints composed of metallic pigments in a vehicle of vegetable or other oil, such pigments comprising, ordinarily, carbonate of lead, iron oxid, &c.; but these paints are known to be an imperfect protection against the rusting or corrosion of iron and steel to which they have been applied.

Taking into consideration the following known facts, namely: first, that iron and steel do not rust or become oxidized when exposed to the action of dry carbonic acid or to pure water free from carbonic acid or to pure water containing slaked lime which is free from carbonic acid, but will be oxidized when subjected to the combined action of water or aqueous vapor and carbonic acid; second, that once rust is formed on iron or steel the oxidation goes on rapidly, partly because the rust or oxid is pulverulent, and therefore does not effectively cover and protect the metal surface, but mainly because the metallic iron, which is electropositive, and the oxid or rust, which is electronegative, form a voltaic couple, and the iron is thus oxidized, not only by the oxygen from the air, but from water, which is decomposed by the electrical action, the liberated oxygen in a nascent condition flowing to the positive pole and combining with the iron; third, that to neutralize the corroding effect of oxygen, carbonic acid, and moisture on iron and steel the latter must be put in contact with some element which may take the place of the iron or steel as a powerful electropositive element. These facts being known, the purpose of the present invention is to provide a composition of matter in the nature of a paint and capable of being applied with a brush to the surface of the iron or steel, such compound containing as one of its most important ingredients zinc as an electropositive metal capable of effecting the object sought.

To this end the compound comprises as its essentials metallic zinc in a finely-divided condition, fluor-spar also in a finely-divided condition, and a liquid vehicle composed, by preference, of heavy crude petroleum and asphaltum, and turpentine, either crude or refined. The proportions of these ingredients may be varied to a considerable extent to suit the requirements; but a paint for ordinary iron or steel structures may have about the following proportions, by weight: metallic zinc in fine powder, twenty pounds; fluor-spar in fine powder, six pounds; crude petroleum, in which asphaltum is dissolved, thirty-four pounds; turpentine, forty pounds; total, one hundred pounds.

The mixture should be carefully stirred before using and during use in order to maintain a substantially uniform distribution of the zinc and spar throughout the liquid mass. A suitable pigment may be added to the compound, if desired; but this is not essential. After the coat of this compound has been applied and has become thoroughly dry the structure may be painted in the usual way of any color desired for decorative purposes.

The finely-divided metallic zinc of the paint will apply itself closely to the surface of the iron or steel, covering it completely as though galvanized, and the liquid vehicle when dry forms a coating impervious to water and most other agencies. The pure metallic zinc in the compound supplies a strong electropositive element. The fluor-spar is a calcium salt which protects the zinc and iron and is not decomposed by carbonic acid and other agencies, as would be the case with other calcium salts, and the turpentine serves as a diluent and drier. The asphaltum is dissolved in the petroleum to an extent sufficient to form a liquid solution of about the consistency of cream.

The coat formed by the compound described is tough, flexible, strongly adhesive, and waterproof and will not be injuriously affected by oxygen, nitrogen, carbonic acid, or sulfurous vapors and gases to which it may be exposed.

Fluor-spar is chosen as a calcium salt because of its unchangeable character under the influences to which it is liable to be subjected. The salt which is employed should be resistant to carbonic acid and also one which contains no carbonic acid.

Having thus described my invention, I claim—

1. A paint for protecting iron and steel from oxidation, consisting of metallic zinc in a finely-divided state, a calcium salt which contains no carbonic acid, and a liquid vehicle which is not soluble in or miscible with water.

2. A composition of matter for coating iron or steel as a protection against oxidation thereof, the same consisting of finely-divided metallic zinc, a liquid vehicle, and fluor-spar.

3. A composition of matter for coating iron or steel as a protection against oxidation thereof, the same consisting of finely-divided metallic zinc, finely-divided fluor-spar, and a liquid vehicle consisting of a solution of asphalt in petroleum and turpentine.

In witness whereof I have hereunto signed my name, this 6th day of June, 1904, in the presence of two subscribing witnesses.

NICHOLAS ALEXEIEVITCH BIBIKOV.

Witnesses:
   HENRY CONNETT,
   BENJAMIN H. HOLT.